(12) United States Patent
Degiere et al.

(10) Patent No.: US 10,372,720 B2
(45) Date of Patent: Aug. 6, 2019

(54) MATCHING ENTITIES ACROSS MULTIPLE DATA SOURCES

(71) Applicant: Microsoft Technology Licensing, LLC, Redmond, WA (US)

(72) Inventors: Chris Degiere, Palo Alto, CA (US); Aarti Kumar, San Carlos, CA (US); Xian Li, Sunnyvale, CA (US); Alexander Power, San Francisco, CA (US); Derek Ribbons, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 360 days.

(21) Appl. No.: 15/339,703

(22) Filed: Oct. 31, 2016

(65) Prior Publication Data

US 2018/0121520 A1    May 3, 2018

(51) Int. Cl.
*G06F 17/30* (2006.01)
*G06F 16/2458* (2019.01)
*G06F 16/248* (2019.01)
*G06F 16/2457* (2019.01)
*H04L 12/58* (2006.01)

(52) U.S. Cl.
CPC ........ *G06F 16/2468* (2019.01); *G06F 16/248* (2019.01); *G06F 16/24578* (2019.01); *H04L 51/04* (2013.01); *H04L 51/14* (2013.01); *H04L 51/22* (2013.01); *H04L 51/28* (2013.01); *H04L 51/32* (2013.01); *H04L 51/20* (2013.01)

(58) Field of Classification Search
CPC ....... G06F 15/16; G06Q 10/107; G06Q 30/02

USPC ......................................................... 707/723
See application file for complete search history.

(56) References Cited

U.S. PATENT DOCUMENTS

| | | | |
|---|---|---|---|
| 6,480,885 B1 | 11/2002 | Olivier | |
| 8,296,257 B1 | 10/2012 | Chavira et al. | |
| 8,521,823 B1 * | 8/2013 | Sheinberg | G06Q 10/107 709/206 |
| 9,002,725 B1 * | 4/2015 | Carobus | G06Q 10/107 705/14.54 |
| 9,105,000 B1 * | 8/2015 | White | G06F 17/30303 |
| 9,596,195 B1 * | 3/2017 | Sheinberg | G06Q 10/107 |

(Continued)

OTHER PUBLICATIONS

International Searching Authority, "Search Report" in application No. PCT/US2017/059395, dated Jan. 9, 2018, 15 pages.

(Continued)

*Primary Examiner* — Jean M Corrielus
(74) *Attorney, Agent, or Firm* — Hickman Palermo Becker Bingham LLP

(57) ABSTRACT

Techniques for performing a fuzzy match of data from multiple sources are provided. In one technique, an email address of a sender of an email message is extracted from the email message. The email address is used to retrieve, from a first data source, first entity data about one or more entities, such as users. The first entity data is used to retrieve, from a second data source, second entity data about one or more entities. First data that pertains to the sender and that originates from the first data source is combined with second data that pertains to the sender and that originates from the second data source to generate sender data. The sender data is then presented via an email client that displays the email message.

17 Claims, 17 Drawing Sheets

(56) References Cited

U.S. PATENT DOCUMENTS

| | | |
|---|---|---|
| 9,911,144 B1* | 3/2018 | Sheinberg ............ G06Q 10/107 |
| 2005/0015432 A1 | 1/2005 | Cohen |
| 2007/0250585 A1 | 10/2007 | Ly et al. |
| 2008/0005249 A1 | 1/2008 | Hart |
| 2008/0162649 A1 | 7/2008 | Lee et al. |
| 2010/0106684 A1* | 4/2010 | Pizzo ................... G06F 16/275 |
| | | 707/610 |
| 2011/0320545 A1 | 12/2011 | Hammer et al. |
| 2012/0179762 A1* | 7/2012 | Arora ................ G06F 17/30312 |
| | | 709/206 |
| 2012/0296973 A1* | 11/2012 | Spivak ................... G06Q 10/02 |
| | | 709/204 |
| 2013/0024465 A1* | 1/2013 | Schiff ................... G06F 16/248 |
| | | 707/749 |
| 2014/0025693 A1* | 1/2014 | Arora ................ G06F 17/30289 |
| | | 707/755 |
| 2014/0081914 A1 | 3/2014 | Smith et al. |
| 2014/0317079 A1 | 10/2014 | Obernikhin et al. |
| 2016/0078111 A1* | 3/2016 | Schiff ................... G06F 16/248 |
| | | 707/728 |
| 2016/0359793 A1* | 12/2016 | Kraios ................... H04L 51/34 |

OTHER PUBLICATIONS

European Claims in application No. PCT/US2017/059395, dated Jan. 2018, 6 pages.

\* cited by examiner

FIG. 3A

Linked in

Mail ▼

| COMPOSE |
|---|
| Inbox (5,663) |
| Starred |
| Sent Mail |
| Drafts (62) |
| Communications (6) |
| Conversation Action S.... |
| Hockey |
| IT (1) |
| Jirra (108) |

Jack

Efrat Orkin — 6:36 AM (9 hours ago) ☆
Hi Team, Following up on the collective feedback of bugs / enhancements for L....

Dan Chiao — 3:47 PM (29 minutes ago) ☆
Hi Alex & Juan, I think the revised design looks good. I have some minor nit...

Alex Chiocchi — 4:00 PM (20 minutes ago) ☆
Hi folks, Are we able to finalize today? Thanks,
Making some more tweaks, We are going to provide another update end of day. S....

Carmen Hernandez  <xyz@xyz.com>  4:05 PM (15 minutes ago) ☆
to me, Jonathan
for the inVision, can we frame it in a 13" monitor as well?

— 412

Click here to Reply, Reply to all, or Forward

SALES NAVIGATOR

Michael
Washington – 2nd
Head of Product at EPI Energy
Greater New York Area
+2 current positions  — 414
Save as lead  ...

✉ in ⌣

Icebreakers  Introductions  CRM 4 shared connections 3 mutual groups
The Energy Group, SunTech Research and 1 other

LinkedIn — Mail

450

COMPOSE
Inbox (5,663)
Starred
Sent Mail
Drafts (62)
Communications (6)
Conversation Action
S...
Hockey
IT (1)
Jirra (108)

Hi Team, Following up on the collective feedback of bugs / enhancements for L...

Efrat Or... Hi Alex...
Dan Chi... Hi folks,
Alex Chi... Making...
Carmen... to me, J... for the in...
Click he...

Save as Lead   ✕

Create a new lead in Salesforce

Select Lead Record Type *
Corp Solutions

Available Lead Record Types

| Record Type Name | Description |
|---|---|
| Corp Solutions | Corp Solutions Lead Record Type |
| Marketing Solutions | This record is used for tracking leads that we see on competitor's websites |

First Name *
Michael

Last Name *
Washington

Title *
Head of Product

Email *
xyz@xyz.com

Phone *
444-444-4444

Account *
EPI Energy

[ Back ]  [ Create ]
452

SALES NAVIGATOR

Michael
Washington – 2nd

Head of Product at EPI Energy
Greater New York Area
+2 current positions

[ Save as lead ]  ...

Icebreakers  Introductions  CRM 4 shared connections
3 mutual groups
The Energy Group, SunTech Research and 1 other

454

Jack

MATCHING ENTITIES ACROSS MULTIPLE DATA SOURCES

TECHNICAL FIELD

The present disclosure relates to network communications and, more particularly, to matching entities identified in multiple storage systems.

BACKGROUND

Many people use email frequently throughout any given day. Whether for work or pleasure, email has persisted as a stable medium through which people stay in touch with co-workers, friends, etc., despite the rise and prevalence of other messaging platforms in the Internet age, such as instant messaging and social media. Email has allowed people to form and maintain contacts over time that would not have persisted without email. However, due to the pervasive use of email, the majority of the working day for many professionals and other users is dedicated to reviewing and responding to email communications.

In addition to email, some people interface with other data sources for their work or personal use. Information contained in email communications may be used to update those data sources. However, having to switch between email and one or more other data sources, matching senders of emails with records in the other data sources, and updating those data sources can be very time consuming and error prone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3A is a screenshot of an example user interface that displays information about a sender, where the information comes from multiple data sources, in an embodiment;

Figure 4B:
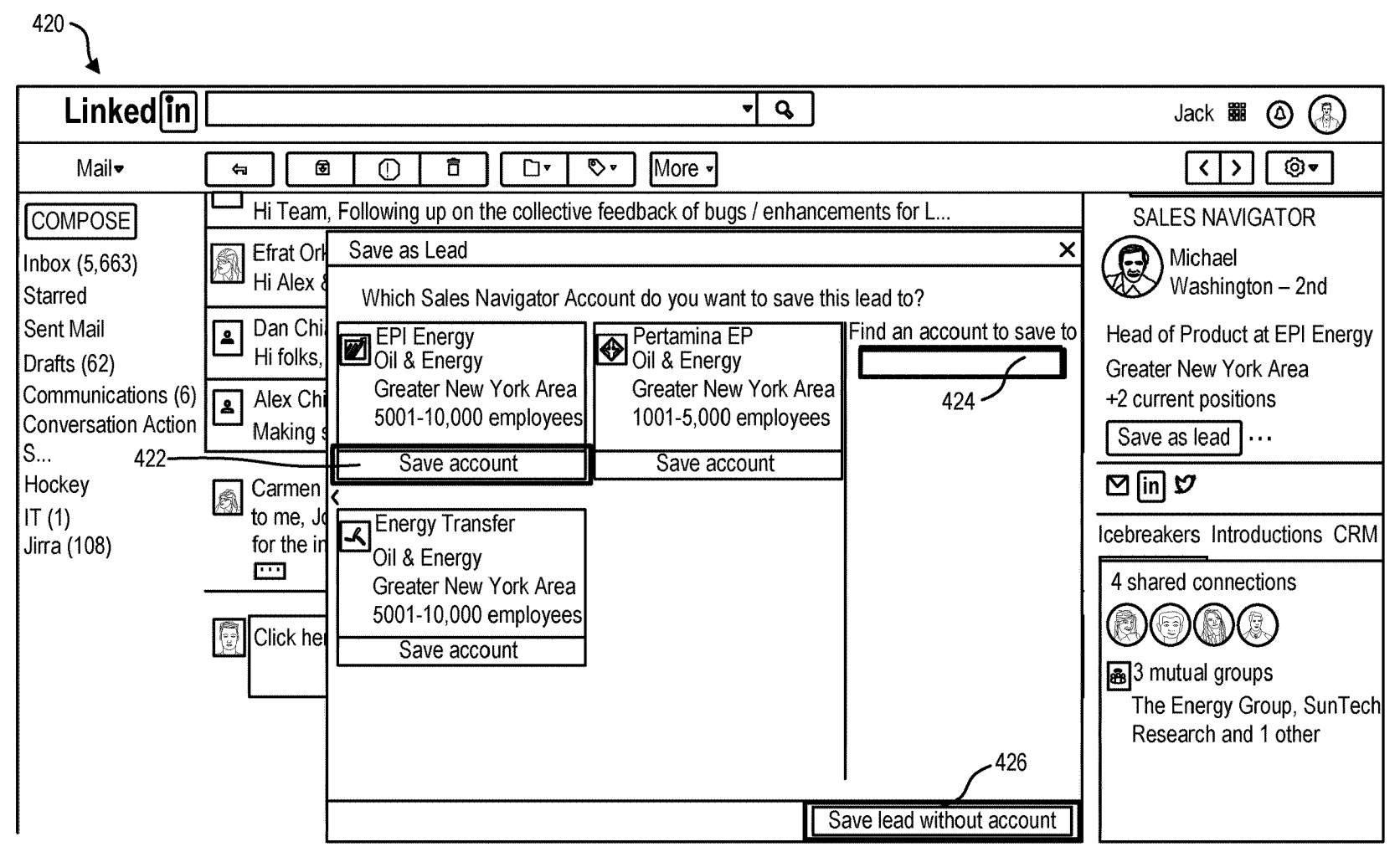
Figure 4C:
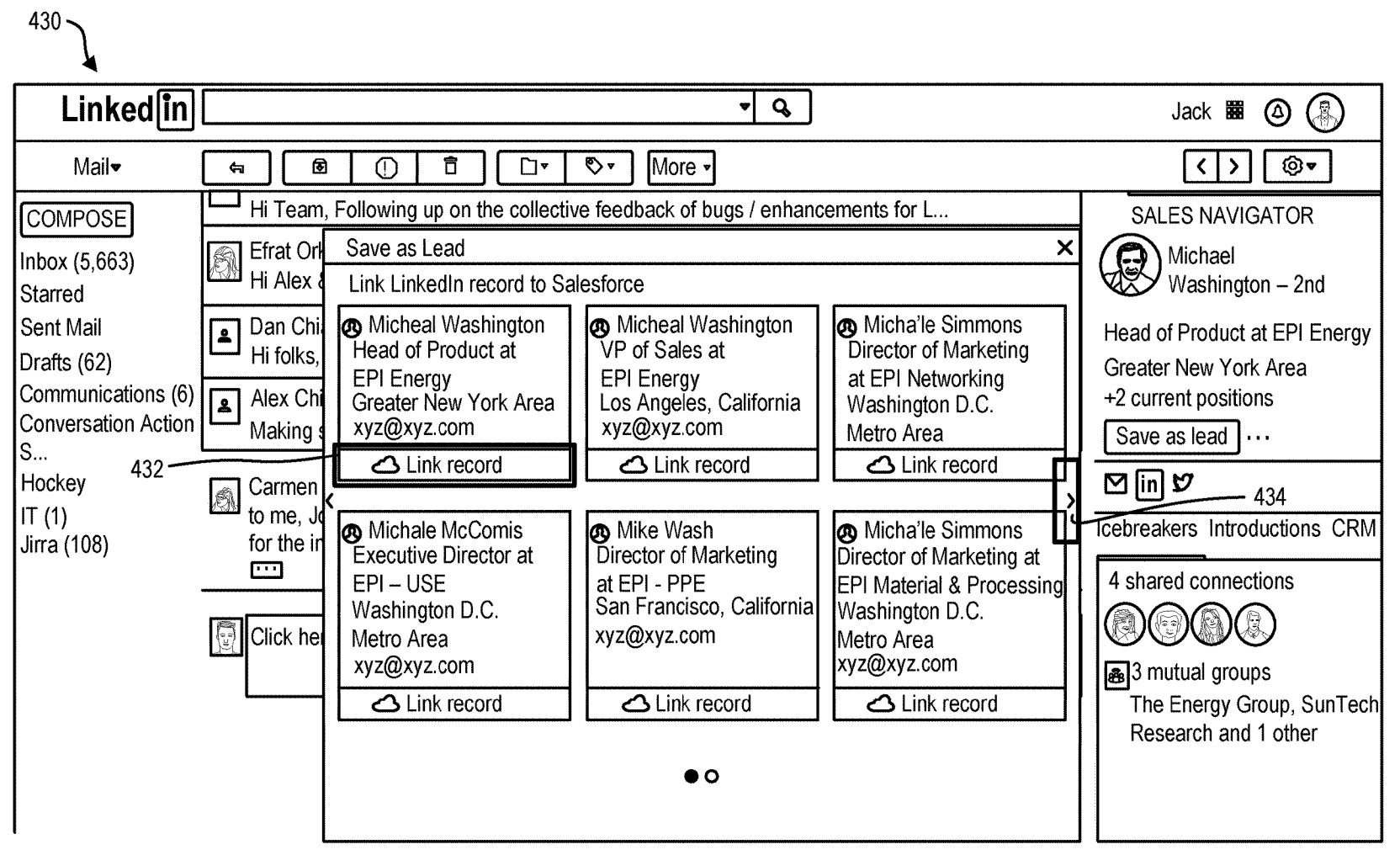
Figure 4D:
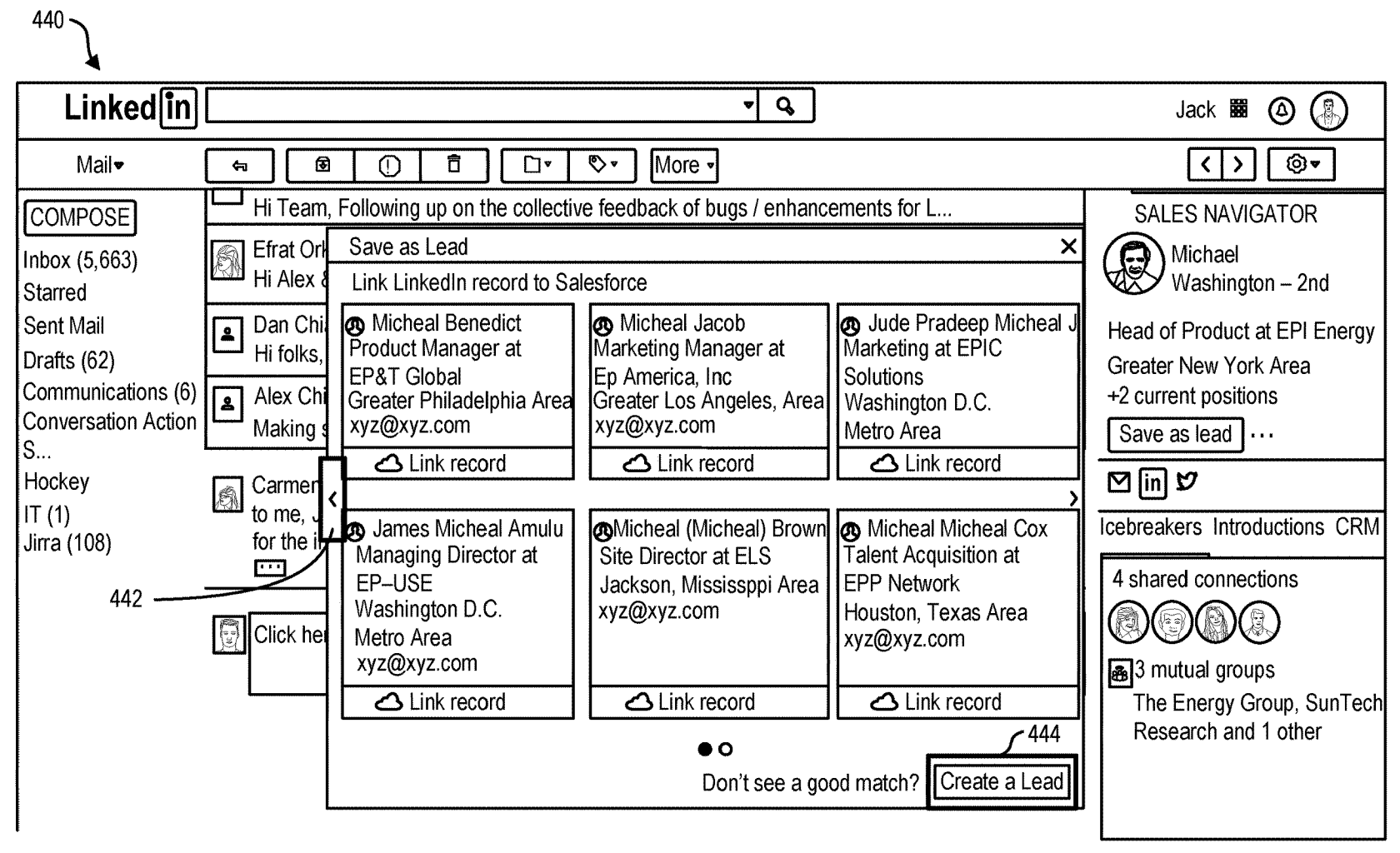
Figure 4F:
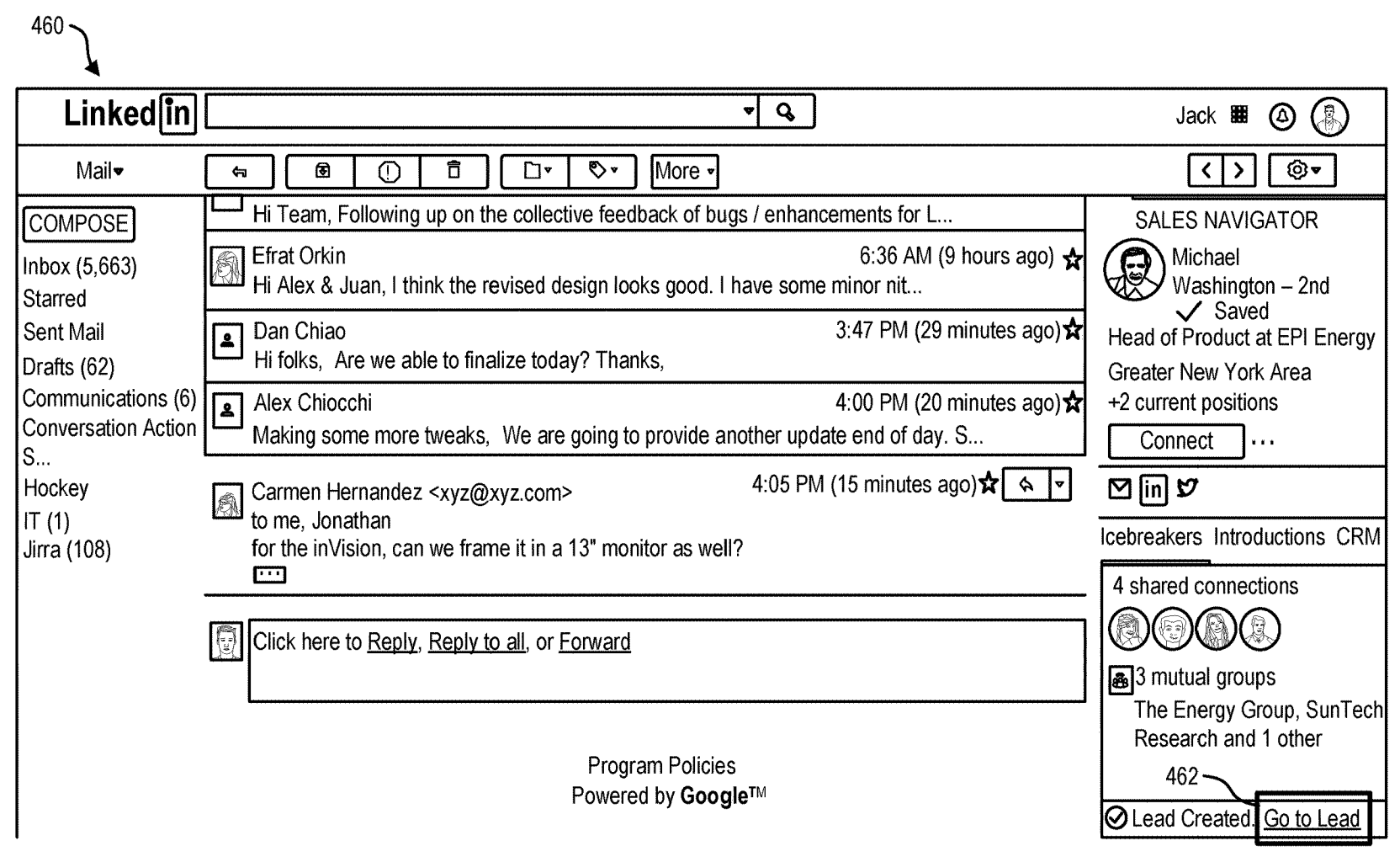
Figure 4G:
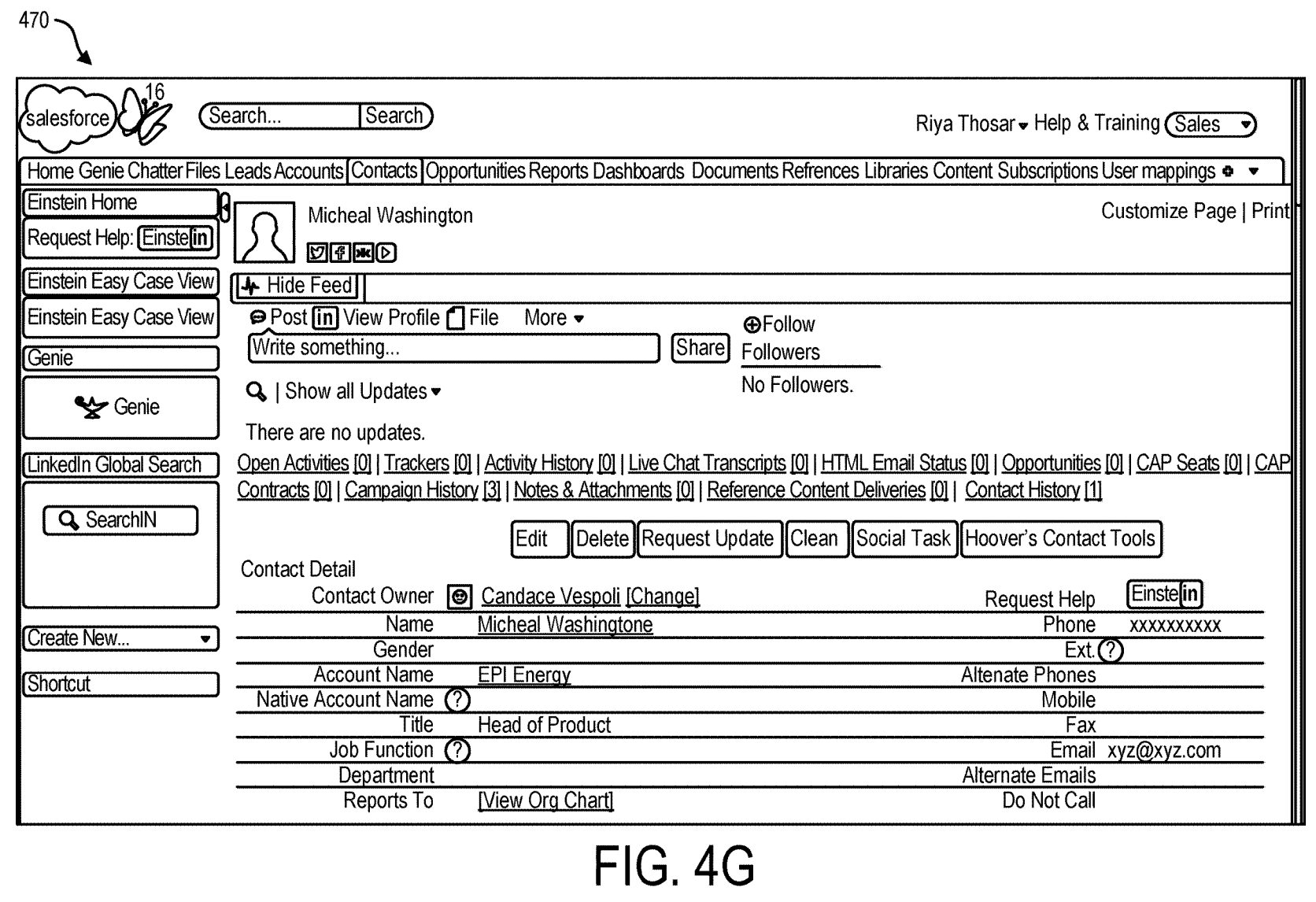

FIGS. 4A-4G are screenshots of example user interfaces that may be displayed when data from a CRM database system is missing, in an embodiment;

FIGS. 5A-5E are screenshots of example user interfaces that may be displayed when data from social network service is missing, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for matching entities across multiple data sources are provided. In one approach, sender data is extracted from an electronic message (e.g., email) to determine whether the sender is identified in multiple data sources, such as a social graph maintained by a social network service provider and a CRM database. The sender data is used to retrieve data from the multiple data sources. Data from each data source may be combined and displayed adjacent to the electronic message (i.e., from the sender), to a different electronic message from the sender, or to a contact listing of the sender.

In a related approach, if a sender of an electronic message matches (at least partially) multiple entities from one or more data sources, then a user (or recipient of the electronic message) is presented with the multiple entities from which the user may select.

In a related approach, data from a first data source (e.g., a user profile in a profile database) may be used to update another data source (e.g., a CRM database) if the first data source contained a matching entity.

Approaches described herein solve the technical problem of incomplete data and data staleness, the presence of which reduces productivity in digital communications. Such approaches retrieve current entity data from multiple remote electronic data sources and intelligently combine the entity data in a single digital location.

System Overview

Figure 1:
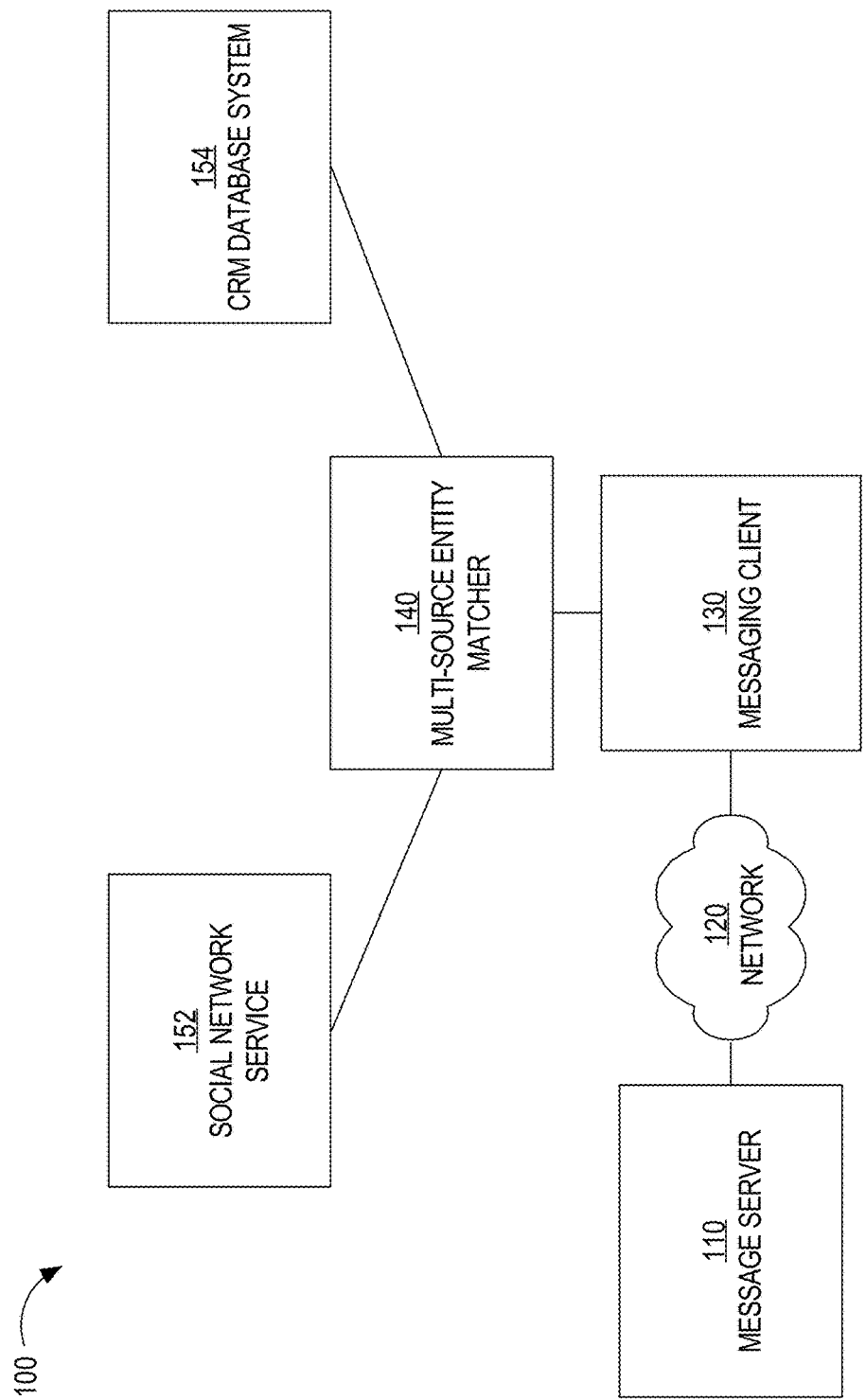
FIG. 1 is a block diagram that depicts an example system for obtaining and combining data from multiple data sources, in an embodiment.

FIG. 1 is a block diagram that depicts an example system 100 for obtaining and combining data from multiple data sources, in an embodiment. System 100 includes multiple elements that may be operated or managed by different entities or organizations. System 100 includes a message server 110, a network 120, a messaging client 130, a multi-source entity matcher (MSEM) 140, a social network service 152, and a CRM database system 154.

Message server 110 transmits messages, received from other clients (not depicted), that are directed or addressed to messaging client 130. Message server 110 may be implemented in software, hardware, or any combination thereof. While FIG. 1 depicts message server 110 has comprising a single element, message server 110 may comprises multiple computing devices and elements. Additionally, system 100 may include multiple messaging servers that are communicatively coupled (e.g., via one or more networks) to messaging client 130. While embodiments described herein are in the context of email messaging, all embodiments are not so limited. Other types of messaging may be used, such as instant messaging, whether through a dedicated client application or a web application.

Network 120 may be implemented on any medium or mechanism that provides for the exchange of data between message server 110 and messaging client 130. Examples of network 120 include, without limitation, a network such as a Local Area Network (LAN), Wide Area Network (WAN), Ethernet or the Internet, or one or more terrestrial, satellite or wireless links.

Messaging client 130 receives messages transmitted from message server 110 and provides a user interface that allows a user of the client to view received messages, respond to received messages, and compose new messages. Messaging client 130 may include a contact database that stores information about individuals associated with previous transmitted messages between them and the user, whether those individuals were recipients of the messages, senders of the messages, or both. Messaging client 130 may thus include a user interface that allows the user to create and view contact information about those individuals, such as name, title, organization, phone number, etc.

Multi-source entity matcher (MSEM) 140 receives, from messaging client 130, message data extracted from an electronic message that messaging client 130 received from message server. The message data may be an email address, an IM identifier, metadata of the electronic message, and/or header and/or footer information from the electronic message. MSEM 140 is implemented in hardware, software, or any combination thereof. MSEM 140 queries social network service 152 and CRM database system 154 using the message data received from messaging client 130. If there is a match from either data source, then MSEM 140 retrieves information from that data source and displays at least a portion of the information on a screen of a computing device. The information may be displayed adjacent to the electronic message from which the message data was extracted. Additionally or alternatively, the information may be displayed in a contacts view or tab provided by messaging client 130, where the information is displayed adjacent to a contact listing that includes information about the sender of the electronic message.

In an embodiment, MSEM 140 stores a mapping or table that associates entities from multiple data sources, such as social network service 152, CRM database system 154, and messaging client 130. For example, a single entry in the mapping or table may associate (1) a sender ID or an email address (extracted from an electronic message) with (2) a specific social network profile of the sender from social network service 152, with (3) a specific user record from the CRM database system 154.

In an embodiment, messaging client 130 includes a plug-in to a web browser, where the plug-in is configured to extract certain message data from an electronic message and send the extracted message data to MSEM 140. In this embodiment, MSEM 140 is implemented on one or more computing devices that are separate and remote from the client device upon which messaging client 130 executes.

In an alternative embodiment, MSEM 140 is a plug-in to a web browser and executes locally (in addition to messaging client 130) on a client device (not depicted), such as a desktop computer, a laptop computer, or a smartphone. However, such an embodiment does not benefit from a single MSEM 140 that can store results retrieved in response to requests from many different instances of messaging client 130 executing on different client devices.

Social network service 152 is a service that maintains and updates a social graph and that allows users (operating electronic devices) to register with social network service 152, create profiles, establish connections with other registered users or members, and perform one or more other actions, such as message other members, post articles, view postings from other members, comment on postings, "like" postings, endorse other members or established connections, etc. A user or member profile may include a name of the member, a job title, a job industry, academic institutions attended, employment status, previous and current employers, skills, endorsements from other members, contact information, address information, etc. Examples of providers of social network service 152 include LinkedIn, Facebook, and Google.

CRM database system 154 is a database system that stores and manages information about users or sales prospects to which sales of one or more products or services are intended to be made. The stored information may comprise numerous records, each record indicating a user name, an address, a phone number, an email address, an IM address, a web address, an employer name, a job title, an activity log, etc.

Both social network service 152 and CRM database system 154 may include many profiles or records that are incomplete. For example, a member of social network service 152 may not include many data items listed above that could be included in the member's profile. Similarly, a user may not provide information about themselves in an electronic form that they filled out. For example, a user may only include their name, job title, and email address. Thus, different data sources may contain incomplete information about many users.

Process Overview

Figure 2:
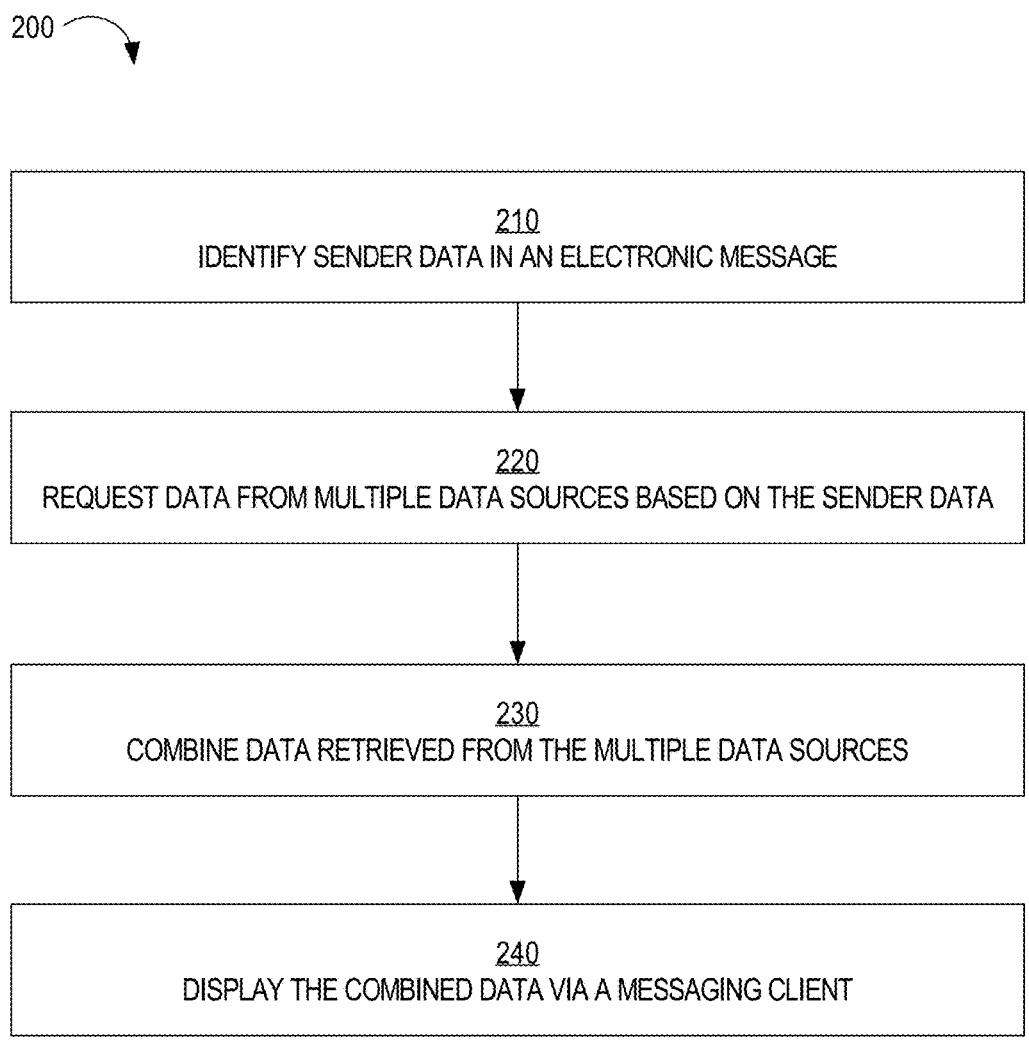
FIG. 2 is flow diagram that depicts a process for retrieving data from multiple sources based on information about a sender of an electronic message, in an embodiment.

FIG. 2 is flow diagram that depicts a process 200 for retrieving data from multiple sources based on information about a sender of an electronic message, in an embodiment. Process 200 may be performed by a single entity or program or by multiple entities or programs, such as a browser plug-in and a remote server.

At block 210, an electronic message is analyzed. Such analysis may involve only analyzing metadata of the electronic message, such as a sender identifier. Examples of sender identifiers include an email address, an IM name or identifier, or any other type of identification for a sender of an electronic message. If the electronic message is an email message, then the sender identifier is an email address of the sender. An email address includes a user name, a domain, and, optionally, a country domain, such as username1@company.com.cn where "cn" is the country domain for China.

Block 210 may be performed by messaging client 130 or by a plug-in to messaging client 130. Thus, messaging client 130 may be configured to analyze an electronic message for certain data and transmit the data to MSEM 140. Alternatively, a plug-in to messaging client 130 is configured to analyze an electronic message for certain data and transmit the data to MSEM 140.

At block 220, sender data is used to request data from multiple data sources. For example, an email address of the sender is sent to MSEM 140, which transmits the email address to multiple data sources, including social network service 152 and CRM database system 154.

In an embodiment, block 220 involves first checking storage that is local to MSEM 140 to determine whether data about the sender is cached or otherwise stored locally after MSEM 140 retrieved the same data from a previous request, for example, from a different messaging client or associated plug-in. For example, a first client device executing an instance of messaging client 130 transmits a particular email address to MSEM 140 and MSEM 140 uses the particular email address to retrieve data about the sender from multiple data sources. MSEM 140 stores the particular email address in association with the data retrieved from the multiple data source. Later, a second client device executing a different instance of messaging client 130 transmits the particular email address to MSEM 140. MSEM 140 checks its cache or local storage to determine whether any data is stored in association with the particular email address. If so, then that data is returned to the second client device. In this way, network requests and latency may be avoided.

In a related embodiment, a timestamp is stored in association with data retrieved from multiple data sources. The timestamp indicates a date and/or time when the retrieved data was retrieved or when to drop the retrieved data. MSEM 140 may use the timestamp to determine whether to delete the data. In this way, MSEM 140 reduces the likelihood of returning stale data about a particular sender to messaging client 130 and forces MSEM 140 to retrieve up-to-date information from multiple data sources, presuming that those data sources reflect a current state of the particular sender.

At block 230, data from multiple data sources is received and combined. Block 230 may involve MSEM 140 receiving data from social network service 152 and CRM database system 154. For example, a request for data from social network service 152 may indicate specific data items to retrieve from an entity profile, such as a name, an employer name, a job title, and a job industry. In this example, combining data from multiple data sources may be trivial and be based on a certain display template into which MSEM 140 inserts data from the different data sources.

Alternatively, a request for data from social network service 152 may request an entity profile (e.g., a user profile or a company profile) that is associated with a particular email address, in which case social network service 152 returns a profile if such a profile exists. In this case, instead of presenting the entire entity profile, block 230 may involve determining which data from the entity profile to retain. Such information may be hard-coded into MSEM 140 or may be indicated in a configuration file that can be updated dynamically (i.e., while MSEM 140 is executing). A restart of MSEM 140 may or may not be required in order for the updated configuration file to be read.

If a data item (e.g., a company name) from one data source conflicts with a data item from another data source, then that conflict may be presented to the viewer, such as via highlighting. In this example, the conflicting data items may be maintained by, and indicated in storage of, MSEM 140. Alternatively, one data source may be considered as more trustworthy than another data source, in which case the conflicting data item from the less trustworthy data source is ignored.

At block 240, the combined data is displayed via messaging client 130. Block 240 may involve MSEM 140 sending the combined data to messaging client 130 (or a plug-in associated therewith). The entity that receives the combined data causes the combined data to be displayed on a screen of a client device.

Portions of an Electronic Message

As electronic message, such as an email message, may comprise multiple sections or portions, such as a header, a footer, a body, and metadata. The header may contain multiple pieces of information, such as FROM, TO, DATE, SUBJECT, and CC headers. Some headers, such as SUBJECT and CC headers may be blank or null. A header may also contain a sending timestamp a receiving timestamp.

A header may also contain routing information, such as which mail transfer agents (MTAs) (between the sender's computer and the recipient's computer) received and forwarded the electronic message. An example of routing information is as follows:

Received: from write.example.com ([205.206.231.26]) by tom.wrath.dc.uk with esmtp id 19OjBy-0001lb-3V for example_to@bath.ac.uk; Sat, 7 Jun. 2005 20:17:30 +0100

From the routing information, geographical location may be derived. For example, a MTA may indicate a domain of a specific country or political entity, such as the United Kingdom. As another example, an absence of a specific country domain may indicate that the email message was sent from, transferred through, or received in a default country domain, such as the United States.

A footer may contain more specific information about the sender or an organization associated with (e.g., that employs) the sender. A footer may contain "signature" data that is personalized to or customized by the sender of the electronic message. Examples of footer information include the sender's name, a name of an organization associated with (e.g., employer of or owned by) the sender, the sender's mailing address, the organization's mailing address, a personal phone number, a work phone number, a fax number, a logo of the organization, etc.

Each data item extracted from an electronic message (hereinafter "EM data item") may be used to identify an entity (e.g., a user or an organization) in one or more remote data sources. For example, one portion of an electronic message may be used to retrieve data from social network service 152 while another portion of the electronic message may be used to retrieve data from CRM database system 154. As a specific example, an email address of a sender may match an email address in a particular user profile maintained by social network service 152 while the email address is not associated with any user in CRM database system 154. Other portions of the corresponding email may be used to identify one or more possible user candidates from CRM database system 154, such as a name of the sender and a name or an organization.

In an embodiment, MSEM 140 sends an EM data item to a (e.g., remote) data source and the data source compares the EM data item to data items of different user profiles or different user records. If an exact match is found, then the data source sends the corresponding user profile or user record (or a portion thereof) to MSEM 140. If multiple partial (or fuzzy) matches are found (as described in more detail below), then the data source sends each partial match to MSEM 140 and MSEM 140 performs additional processing. Examples of additional processing include determining whether to present the corresponding user profile or user record (or a portion thereof) to the viewer and comparing the partial matches to an exact match or partial matches retrieved from another data source.

Presenting a Match

Figure 3A:
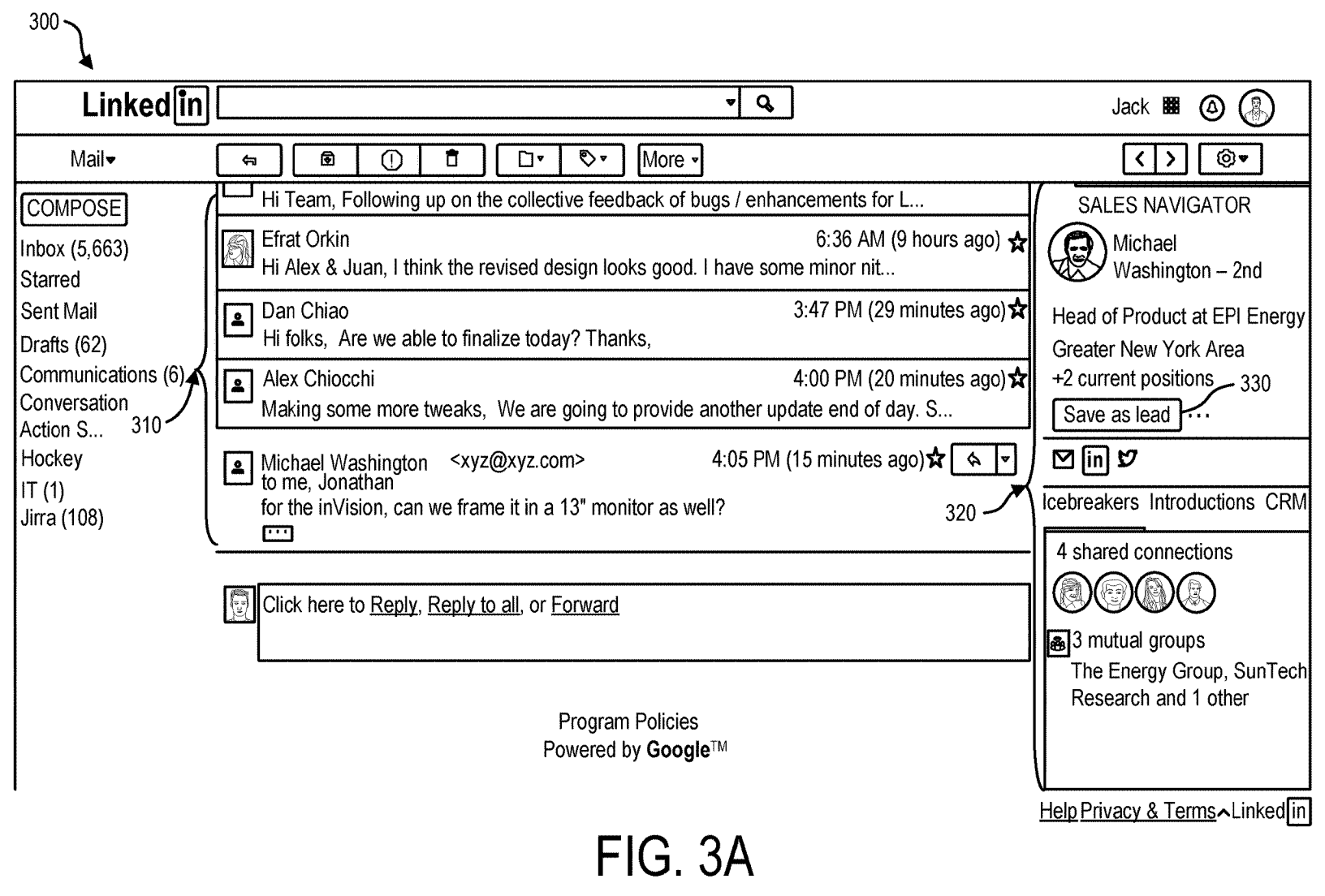

FIG. 3A is a screenshot of an example user interface 300 that displays information about a sender, where the information comes from multiple data sources, in an embodiment. User interface 300 is provided through a web browser executing a web email client, such as Google's Gmail. Other embodiments may involve a local executing email client, such as Microsoft's Outlook.

User interface 300 displays (1) an email conversation 310 that comprises multiple email messages and (2) sender data 320 about a sender of one of the multiple email messages, such as the email that is currently being displayed. In this example, sender data 320 includes a name of the sender, a job title of the sender, a name of a company that employs the sender, a geographic location (e.g., of the company), and a connection degree relative to the viewer (indicating how close the sender is to the viewer in a social graph). Some of this information may originate from one data source while the remaining information may originate from another data source.

Sender data 320 also includes information that indicates commonalities between the sender and the viewer, such as the number of connections in common (and who those connections are) and the number of groups to which both the sender and viewer belong (and the identity of those groups). Such information is referred to as "icebreakers" since the viewer, in any future communication with the sender, can reference those commonalities in order to build a relationship of trust.

Sender data may also include information that indicates recent changes to the sender's user profile, such as updates to his/her job title, changes in job positions and/or employers, additional skills, additional endorsements, etc. Thus, such information may come from social network service 152.

Sender data may also include information from CRM database system 154, such as recent activity with respect to the sender, such as when the sender filled out a particular form, when the sender last received email from the viewer or an associate of the viewer, when the sender last sent an email to the viewer or an associate of the viewer, when the sender had a phone conversation with the viewer or an associate of the viewer, and/or when the sender had a (e.g., in-person) meeting with the viewer or an associate of the viewer.

Figure 3B:
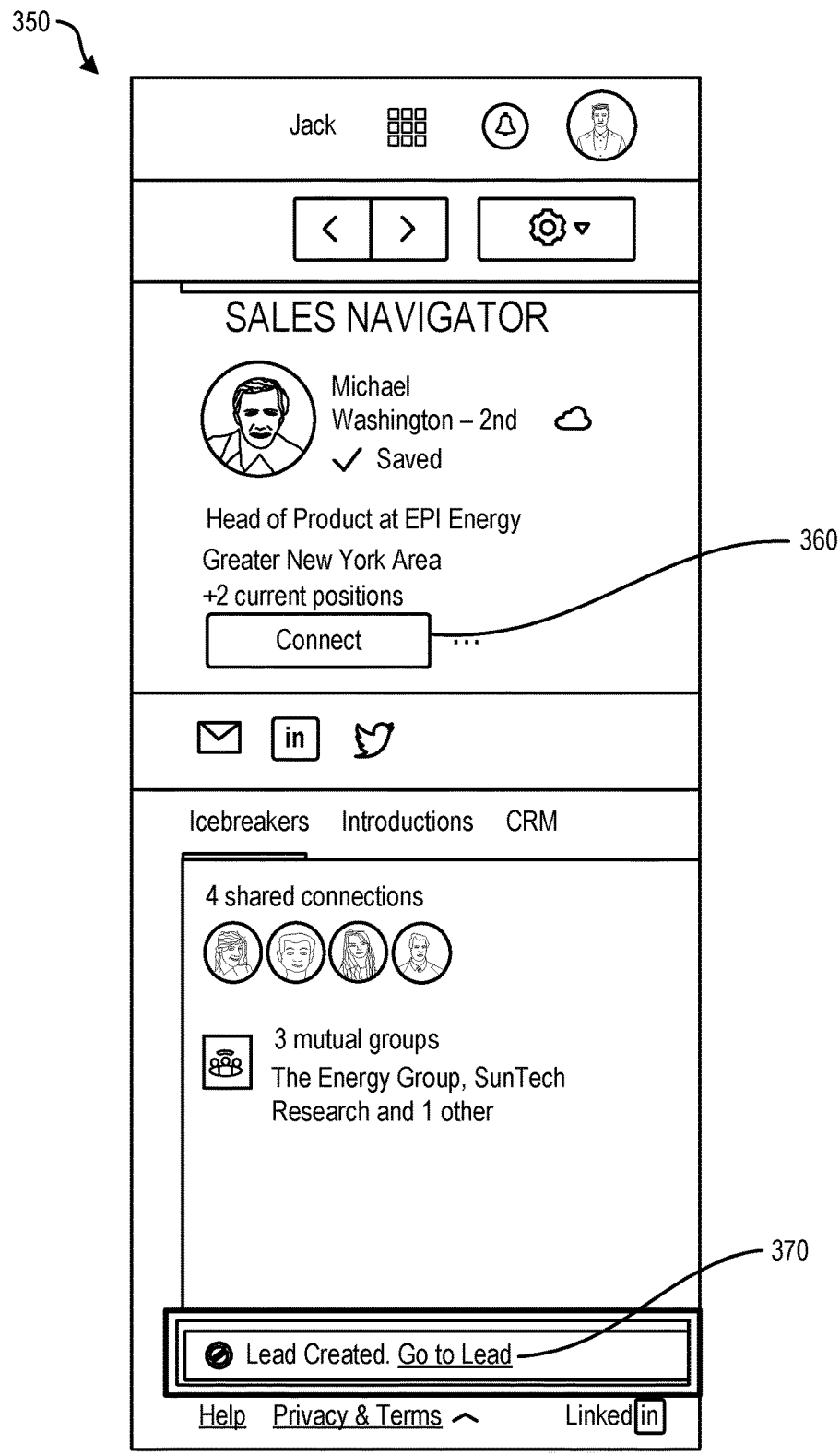
FIG. 3B is a screenshot of a portion of a user interface after a viewer selects a graphical element, in an embodiment.

In the depicted example, user interface also includes UI button 330 that allows the viewer to save information about the sender as a lead or prospect in CRM database system 154, effectively creating a data record for the sender. Selection of UI button 330 also creates a link between (1) the sender's email address and (2) a record in the CRM database system 154 and/or a record in another data source. FIG. 3B is a screenshot of a portion 350 of user interface 300 after the viewer selects UI button 330. Portion 350 replaces UI button 330 with UI button 360 that, when selected, causes a message (that invites the sender to connect with the viewer) to be sent to the sender via social network service 152. Such a message may appear in a message "inbox" maintained by social network service 152. Alternatively, the sender may have established, with social network service 152, settings that indicate that messages to the sender should be forwarded by email, text message, or other message system to the sender.

Portion 350 also includes a selectable link 370 that, when selected, causes an application corresponding to a lead management system (e.g., CRM database system 154) to be opened and displayed with information about the sender contained in a user interface displayed by the application. Link 370 may be a HTTP link that may have been generated by MSEM 140 "on-the-fly" or may have been retrieved by MSEM 140 in response to determining that the sender has a corresponding record in CRM database system 154.

In some embodiments, a single instance of user input (e.g., a "click") may be all that is required to create a link or association between a sender indicated in messaging client 130 and an entity indicated in a remote data source, such as social network service 152. In other embodiments, no user input is required in order for data about a sender from one or more remote data sources to be presented to a viewer of an electronic message of the sender.

Narrowing Results from One Data Source Based on a Result from Another Data Source In the above example, a single entity is identified in a first data source but multiple candidate entities are identified in a second data source. In an embodiment, information about the single entity from the first data source is used to narrow the results identified in the second data source. MSEM 140 may perform this "narrowing."

For example, one or more EM data items are used to identify a particular user profile from social network service 152. However, the one or more EM data items match data items (or would match data items) from data records, of multiple candidate users, stored in CRM database system 154. Data from the particular user profile is extracted and used to search across the data records of the multiple candidate users.

As another example, an email address extracted from an email message is used to identify a single data record stored in CRM database system 154, the single data record identifying a single person. However, the email address is not found in any user profile maintained by social network service 152. Instead, one hundred user profiles that contain an email address with the same domain as the extracted email address are identified. In response to that determination, information from the data record is used to filter the one hundred user profiles. The information may include a name of a user, a geographic location of the user, and a job title.

Fuzzy Matching

In an embodiment, displaying multiple candidate entities (whether from one data source or another) to a viewer is performed in response to determining one or more "fuzzy matches." A fuzzy match is an entity that is determined to at least partially match the one or more EM data items. An exact match, on the other hand, is where the candidate entity is sure to be the only entity that is associated with the one or more data items. For example, some data items may be uniquely identifying of entities, such as an email address, which is presumed to be uniquely associated with only a single person. Data items such as a person's name or an email domain are not considered to be uniquely identifying. For example, multiple people with the name David Johnson may work at the same company. However, the more EM data items that match a user's profile or data record, the more likely it is that the corresponding entity matches.

As another example, while a sender's email address might not match any record in CRM database system 154, it is determined that a name of the sender matches 20 records in CRM database system 154. It is also determined that the domain of the sender's email address corresponds to (or is associated with) a particular company and only one of the 20 user records indicates the particular company. Therefore, that one record is presented to the viewer as an option to select, with or without options corresponding to the other 19 user records.

In addition to company or organization affiliation, geographic information of a sender derived from an electronic message may be used to identify a fuzzy match. For example, routing information from metadata of an email message indicates that the sender is likely in Germany. Thus, all else being equal, user profiles (or data records) that indicate that the corresponding user is in Germany are ranked higher than those user profiles or data records that do not so indicate. In addition to routing information, geographic information of a sender may also be derived from a domain of the sender's email address (e.g., user1@company.com.de) or from a footer of the electronic message.

Any technique for generating a match score that indicates a likelihood that an entity is associated with one or more EM data items may be used. For example, different types of EM data items may have different weights. The higher the weight, the higher the match score. For example, a match between an EM domain name and domain name indicated in a user profile may have a higher weight than a match of a first name, but a lower weight than a match of a last name.

In a related example, the uniqueness of a person's name (e.g., first name or a last name) may alter the weight of any match on that type of EM data item. For example, a match on the last name "Smith" may be weighted lower than a match on the last name of "Weppler." The uniqueness may be determined based on data outside of system 100 or within system 100. For example, uniqueness may be determined based on creating a histogram of last names extracted from user profiles maintained by social network service 152.

In a related example, the uniqueness of an email domain may alter the weight of any match on that type of EM data item. For example, a match on the email domain of "yahoo.com" may be weighted lower than a match on "companyA.com" if there are far fewer email addresses with the latter email domain relative to the former email domain.

A match score might not be scaled. For example, there may be an exact match (e.g., based on an email address, in which case generating a match score is not necessary), a zero match (where zero EM data items match), or a fuzzy match whose match score is above 0 and where at least one EM data item matches a data item within an entity profile (e.g., from social network service 152) or a user record (e.g., in CRM database system 154).

Machine Learning

In an embodiment, a fuzzy match score is generated using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with different entities, such as users indicated in a user profile database or a CRM database. The statistical model is trained based on multiple attributes described herein. In machine learning parlance, such attributes are referred to as "features." To generate and train a statistical model, a set of features is specified and a set of training data is identified.

Embodiments are not limited to any particular machine learning technique for generating a statistical model. Example machine learning techniques include linear regression, logistic regression, and random forests.

The statistical model is referred to herein as a "fuzzy matching model" that takes, as input, an indication, for each of multiple types of data items that can be extracted from an electronic message, whether there is a match of the data item with a data item from a user profile or user record. The fuzzy matching model generates a fuzzy match score that indicates a likelihood of a match. If the fuzzy match score is above a particular threshold (e.g., 50%), then an association is stored between the sender data and a user profile or user record. For example, if a company domain, a geographic region, and a sender's full name are extracted from an electronic message and those three data items match three data items in a user profile maintained by social network service 152, then a fuzzy match score may be 0.85, indicating that there is a 85% likelihood that the user profile is indeed of the sender.

Different features (corresponding to different types of data items) in the fuzzy matching model may have different weights reflecting the relative importance of each type of data item on the overall probability score. For example, a match on company domain may have a higher effect on a probability score than a match on geographic region.

For a particular set of EM data items extracted from a particular electronic message, that set of EM data items may match different user profiles or user records differently. For example, four EM data items from an electronic message may match data items from a first user profile but only two EM data items may match data items from a second user profile. Thus, the first user profile may have a higher fuzzy match score then the second user profile. However, if one matching EM data item in the second user profile that does not have a match in the first user profile has a relatively high positive factor or weighting, then the second user profile may have a higher fuzzy match score than the first user profile.

If the probability score is below a first threshold (e.g., 50%), then multiple user profiles or user records (or portions thereof) having fuzzy match scores above a second threshold (e.g., 15% or 0%) are presented to the viewer as options to select, as described in more detail below. Regardless of how multiple entities are selected using the fuzzy matching model, those entities with relatively higher fuzzy match scores may be ranked higher (and, thus, presented before or above) entities with relatively lower fuzzy match scores.

Leveraging Connections to Identify Matches

In an embodiment, connection data contained in a user profile maintained by social network service 152 may be used (in conjunction with EM data items) to narrow down (or reduce) the number of candidate entities. For example, an email message may contain email addresses in the respective CC and BCC fields. It may be presumed that a recipient associated with one of those email addresses might be a connection or friend of the sender or of the receiver/viewer. Thus, even though one or more EM data items may only partially match a user profile maintained by social network service 152, information about a cc'd recipient extracted from the electronic message is compared to information about one or more connections indicated in (or associated with) the user profile.

For example, an email address of a sender does not match an email address in any user profile maintained by social network service 152. However, the domain of the email address and the username portion of the email address are used to identify 18 user profiles. An email address of a cc'd recipient indicated in the email message from the sender is compared to email addresses of connections of each user corresponding to the 18 user profiles. Such a comparison results in identifying two user profiles (since the email address of the cc'd recipient exactly matches a connection of the two corresponding users, indicating that two different users have a common connection). Thus, those two user profiles (or portions thereof) may be presented to the viewer as options to select. Additionally, those two user profiles may be presented concurrently with user profiles of the other 16 user profiles, but, due to the connection match, the two user profiles are ranked higher than the 16 user profiles.

In the above example, the email address of the cc's recipient may not exactly match the email address of any connection of the 18 users. Instead, portions of the email address may partially match portions of one or more email addresses of the connections. In either an exact match scenario or a partial match scenario, any match of one or more EM data items with one or more profile data items of a connection of a sender may increase the match score of the sender.

Allowing Message Viewer to Select an Entity

In an embodiment, MSEM 140 causes data about multiple candidate entities (or users) to be displayed to the viewer (or recipient) of the electronic message to allow the viewer to select an entity from the multiple candidate entities.

In an embodiment, there is a use case for each data source. Thus, if there are two data sources, then one use case is for when data is missing from one data source (e.g., social network service 152) and the other user case is for when data is missing from the other data source (e.g., CRM database system 154).

Use Care: When CRM Data is Missing

For example, multiple entity profiles are identified as a result of searching (based on one or more EM data items) an entity profile database maintained by social network service 152. The multiple entity profiles may have been filtered based on one or more data records retrieved from CRM database system 154. Data from each of the multiple entity profiles is displayed to the viewer to allow the viewer to select one of the multiple entity profiles. The multiple entity profiles may include a subset of the information actually contained in the corresponding entity profiles, such as a name, organization, job title, and job industry.

As a specific example, FIGS. 4A-4G are screenshots of example user interfaces that may be displayed when data from CRM database system 154 is missing, in an embodiment. At least some of the user interfaces are provided by messaging client 130 (and, optionally, one or more plug-ins).

The user interface in screenshot 410 of FIG. 4A includes user data 412 from social network service 152. User data 412 is similar to sender data 320. For example, user data 412 indicates different ways to communicate (including email, messaging through social network service 152, and Twitter), each with a single click of a button or a single tap on a touchscreen.

The user interface also includes a button 414 that, when selected, causes information about the corresponding user (Michael Washington, in this example) to be saved in a user record in CRM database system 154. Selection of button 414 causes the user interface depicted in screenshot 420 of FIG. 4B to be displayed.

The user interface in screenshot 420 includes information about three accounts from which the viewer can select. The three accounts may have been identified by MSEM 140 in response to receiving sender data from messaging client 130 and using the sender data to identify possible matches in an account database (e.g., a third data source). Different portions of the sender data may have matched different portions of account records/profiles of the three accounts. The user interface also includes at least three locations through which the viewer can provide input: button 422, text field 424, and button 426. User selection of button 422 causes a link or association to be created that associates the sender with the account that corresponds to button 422. User selection of text field 424 allows the viewer to input characters to find a different account and the interface may display any accounts that satisfy the input. User selection of buttons 422 and 426 causes screenshot 430 depicted in FIG. 4C to be displayed.

The user interface in screenshot 430 includes information about six user records from CRM database system 154. The six user records are considered at least partial matches. The user interface also includes a button for each user record, including button 432. User selection of button 432 causes a link or association to be created that associates the sender data with the corresponding user record. User selection of button 432 also causes the user interface in screenshot 460 depicted in FIG. 4F to be displayed. User selection of tab 434 causes the user interface to be updated, as depicted in screenshot 440 of FIG. 4D.

The user interface in screenshot 440 includes six more user records that are considered partial matches to the sender data (and/or a user profile that was identified from a data source based on the sender data). The user interface also includes tab 442 that, when selected, causes the previous user interface (i.e., in screenshot 430) to be displayed. The user interface also includes a button 444 that, when selected, causes another user interface to be displayed, as depicted in screenshot 450 of FIG. 4E.

The user interface in screenshot 450 allows the viewer to input information about the sender, such as first name, last name, job title, email address, phone number, and account name. The user interface also includes a back button 452 that, when selected, causes the previous user interface (i.e., depicted in screenshot 440) to be displayed. The user interface also includes a create button 454 that, when selected, causes user interface depicted in screenshot 460 of FIG. 4F to be displayed. The link associated with create button 454 may be a URL that references another web domain and that contains data that uniquely identifies a particular user record relative to other user records from that web domain.

The user interface in screenshot 460 is similar to the user interface in screenshot 410. One difference is that the sender is now linked to a user record in CRM database system 154. Accordingly, the user interface includes a link 462 that, when selected, causes a user interface of a different (e.g., web) application to be displayed, specifically the user interface depicted in screenshot 470 of FIG. 4G. This latter user interface depicts information about the sender and allows the viewer to manually update the user record or perform other actions relative to the sender. This latter user interface may also display or otherwise allow the viewer to view task data indicating tasks (and their respective dates/times) that have been performed relative to the sender in the past. The task data may be implemented as a list (e.g., in order of occurrence) as a calendar (e.g., where days/weeks/months in which a task occurred are highlighted or otherwise distinguished from other days/weeks/months), or any other type of view. Example tasks include having a meeting, having a phone call, a sent email, a received email. The user interface may also include notes that one or more users (e.g., other than the viewer) have input into CRM database system 154 regarding the sender.

Use Care: When Social Network Data is Missing

FIGS. 5A-5E are screenshots of example user interfaces that may be displayed when data from social network service 152 is missing, in an embodiment. The user interfaces are provided by messaging client 130 (and, optionally, one or more plug-ins).

Figure 5A:
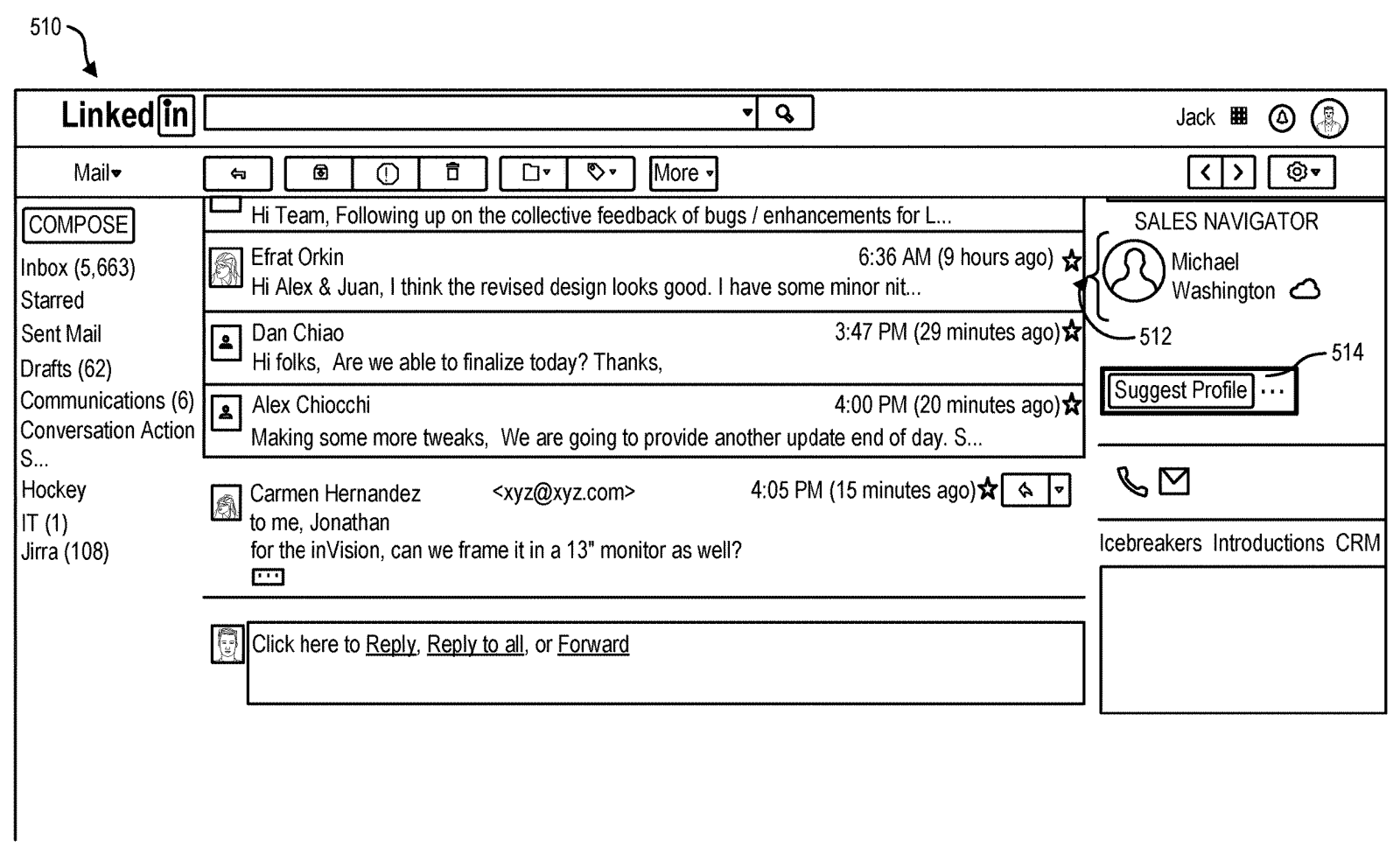
Figure 5B:
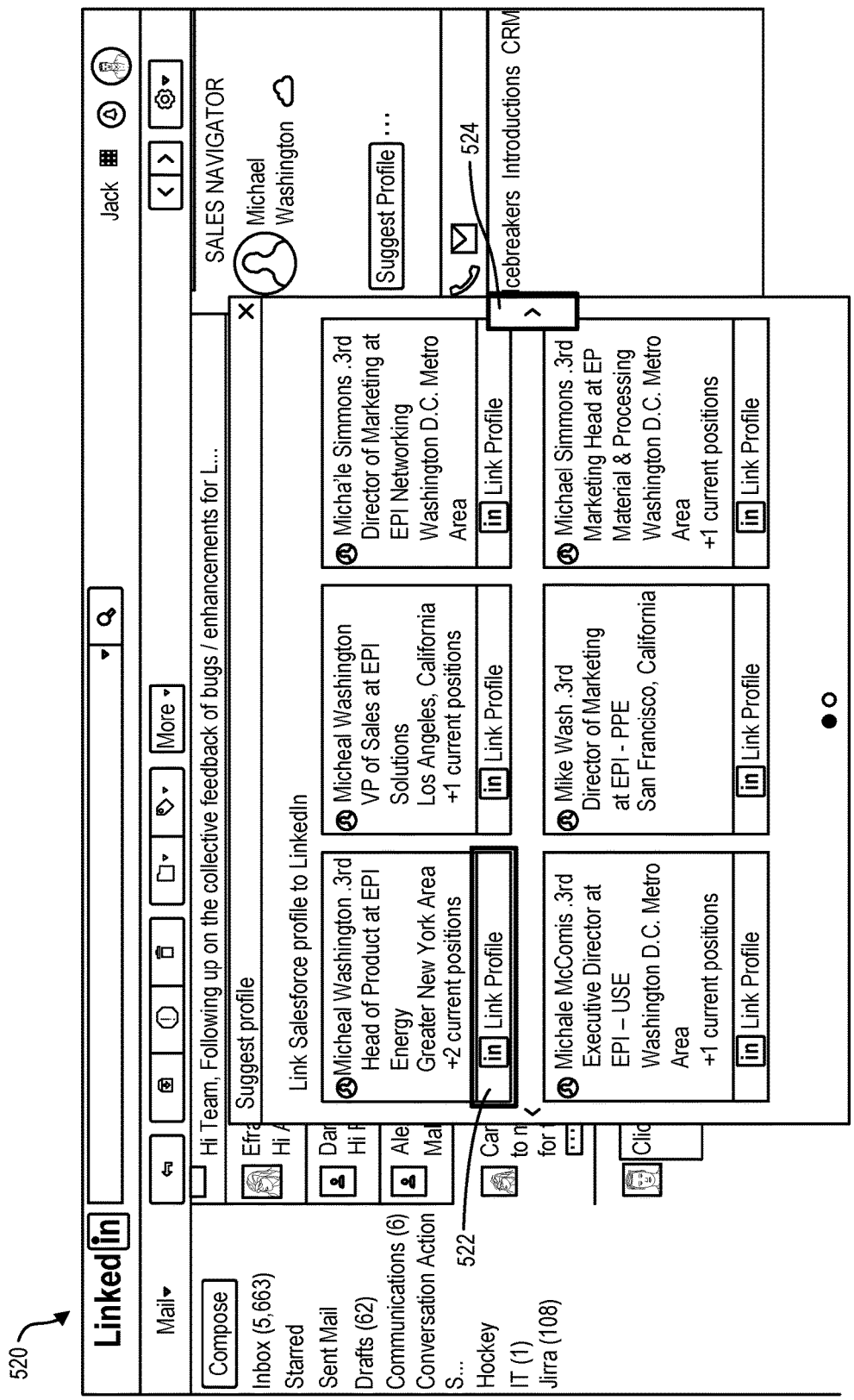
Figure 5C:
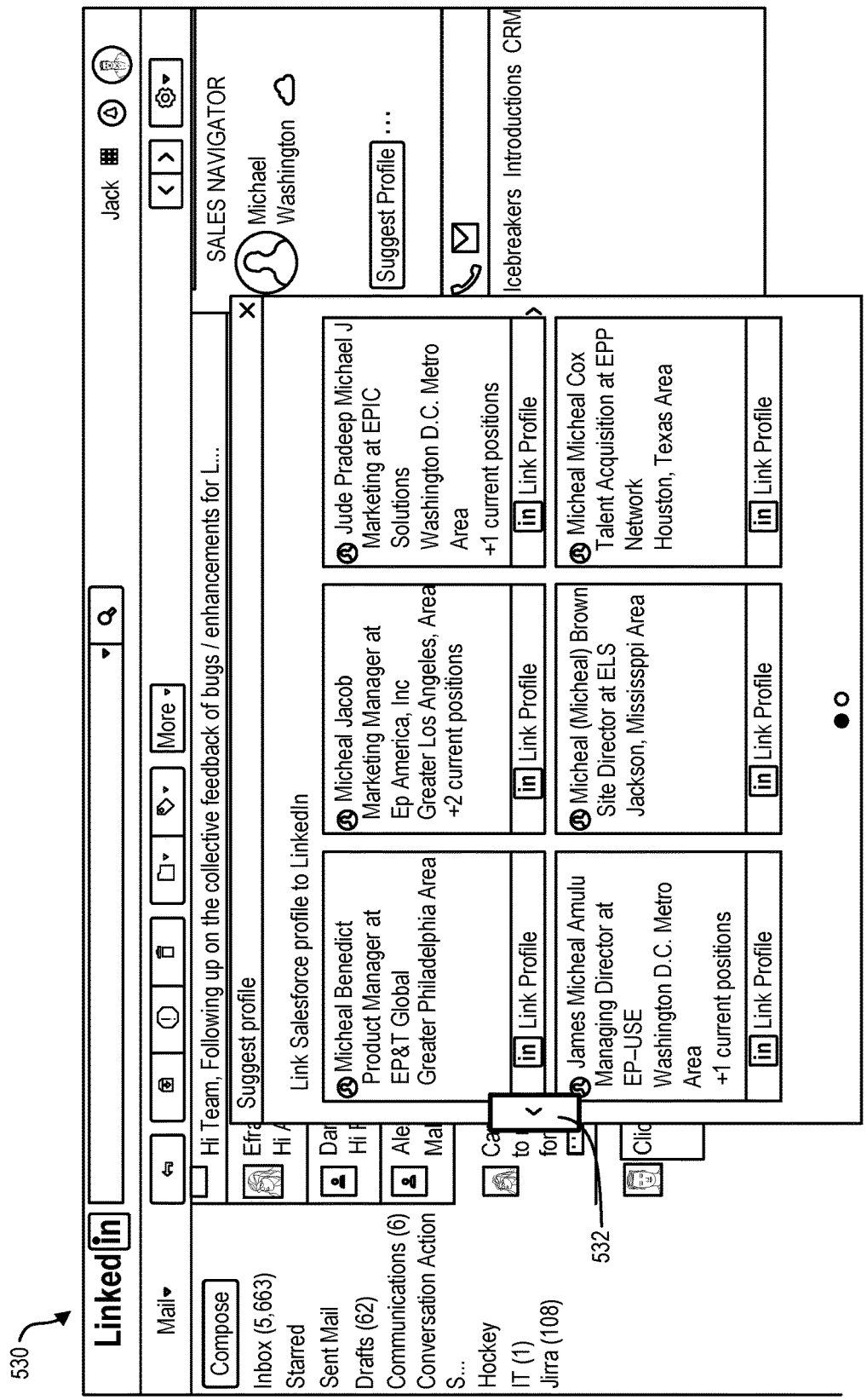

The user interface in screenshot 510 of FIG. 5A includes user data 512 that has been extracted from an electronic message sent by a sender and/or has been retrieved (e.g., by MSEM 140) from CRM database system 154. Thus, user data 512 may be retrieved from a record in CRM database system 154. In this example, user data 512 comprises a name of the sender, Michael Washington. The user interface also includes a suggest profile button 514 that, when selected, causes the user interface depicted in screenshot 520 of FIG. 5B to be displayed.

The user interface in screenshot 520 includes information about six users, from which the viewer can select. The six users may have been identified by MSEM 140 in response to receiving sender data from messaging client 130 and using the sender data (in this example, at least the name Michael Washington) to identify possible matches in a user profile database maintained by social network service 152. Different portions of the sender data may have matched different portions of user profiles of the six users.

The user interface also includes a link profile button for each of the six users, including link profile button 522. User selection of link profile button 522 causes a link or association to be created that associates the sender with the user profile that corresponds to link profile button 522. User selection of next tab 524 causes screenshot 530 depicted in FIG. 5C to be displayed.

The user interface in screenshot 530 includes information about six more user profiles from social network service 152, each user profile being associated with a different link profile button. The user interface also includes a back tab 532 that, when selected, causes the user interface in screenshot 520 to be displayed.

Figure 5D:
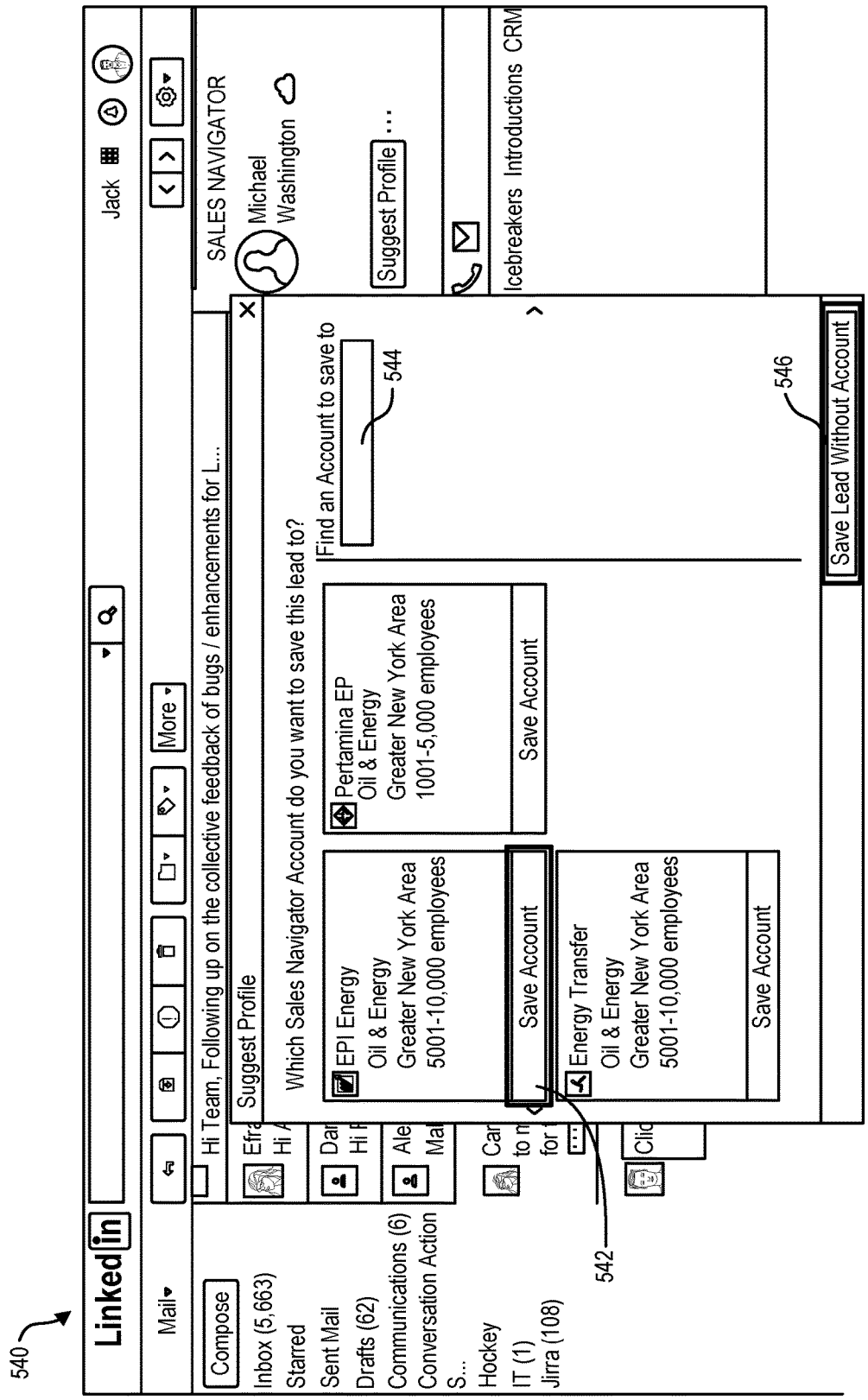
Figure 5E:
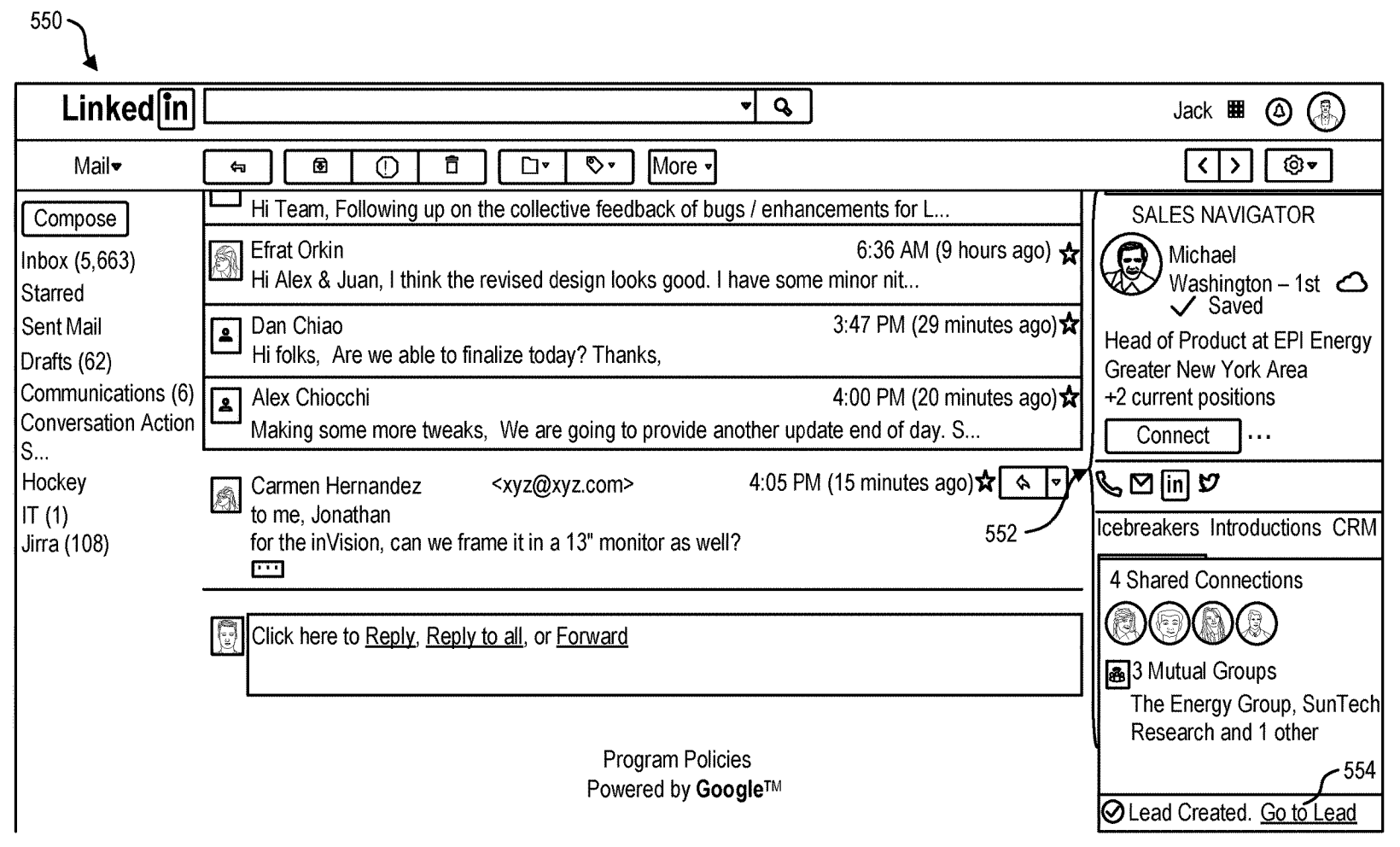

User selection of any of the link profile buttons, including link profile button 522, causes the user interface depicted in screenshot 540 of FIG. 5D to be displayed. The user interface in screenshot 540 is similar to the user interface in screenshot 420. For example, the user interface in screenshot 540 includes at least three locations through which the viewer can provide input: button 542, text field 544, and button 546. User selection of button 542 causes a link or association to be created that associates the sender with the account that corresponds to button 542. User selection of text field 544 allows the viewer to input characters to find a different account and the interface may display any accounts that satisfy the input. User selection of either button 542 or 546 causes screenshot 550 depicted in FIG. 5E to be displayed.

The user interface in screenshot 550 is similar to the user interface in screenshot 410 where user data 552 is displayed adjacent to an email conversation. The user data 552 is based on user selection of one of the link profile buttons described previously. The user interface also includes a link 554 that, when selected, causes a user interface of a different (e.g., web) application to be displayed, such as the user interface depicted in screenshot 470 of FIG. 4G.

Maintaining Associations

In an embodiment, MSEM 140 stores mapping data where each mapping associates sender data from an electronic message with records or profiles from one or more other data sources. For example, MSEM 140 stores an association between (1) a sender's email address, (2) the sender's profile maintained by social network service 152, and (3) a record of the sender in CRM database system 154. The association may be between an email address (from messaging client 130), a first remote data source identifier (e.g., a user profile identifier from social network service 152), and a user record identifier (from CRM database system 154).

In some scenarios, a sender might not have yet created a user profile using social network service 152. In that case, MSEM 140 stores an associated between just the sender's data (e.g., email address) and a record in one data source (e.g., CRM database system 154). Also, the sender may be sent an email or another message through a different communication medium inviting the sender to register with social network service 152. Either the viewer initiates sending the message to the sender or the message is initiated automatically by MSEM 140 or some other component (e.g., social network service 152), such as through an advertisement that targets the sender (but that does not necessarily identify the sender).

Later, when the viewer returns to messaging client 130 to check his/her messages or to compose a message, messaging client 130 (or a plug-in) automatically sends, to MSEM 140, a request with sender data of a particular sender. MSEM 140 looks up, in the mapping data, the association that includes the sender data (e.g., an email address), identifies one or more other data items in the association (e.g., a user profile identifier and a user record identifier) and uses each data item to retrieve data from the corresponding data source.

In a related embodiment, MSEM 140 caches retrieved data (e.g., from social network service 152 and from CRM database system 154) pertaining to certain sender data for a period of time. If the period of time has elapsed for that sender data, then a subsequent request from a messaging client with the sender data will trigger MSEM 140 retrieving the corresponding data from the one or more data sources.

In an embodiment, multiple messaging clients are communicatively coupled to MSEM 140. Thus, storage of the mapping data allows multiple viewers to leverage processing done in response to requests initiated by previous viewers. For example, sender data is sent from messaging client 130 to MSEM 140 in response to viewer A viewing an email message from a particular sender. MSEM 140 identifies an exact match from social network service 152 and in CRM database system 154. MSEM 140 creates and stores an association between the sender, a user profile identifier, and a user record identifier. Later, MSEM 140 receives the sender data from a different messaging client (of viewer B) and determines that the sender data matches the sender data in the association. MSEM 140 uses the association to identify the user profile identifier and retrieve the corresponding user profile (or a portion thereof) from social network service 152. Additionally, MSEM 140 may use the association to identify the user record identifier and retrieve the corresponding user record (or a portion thereof) from CRM database system 154. MSEM 140 sends the retrieved data (or a portion thereof) to the messaging client of viewer B.

As another example, viewer A is presented with multiple candidate entities (because of multiple fuzzy matches with the sender data and no exact matches) and selects one of them. The selection is sent to MSEM 140, which creates and stores an association between the sender data and a user profile identifier or a user record identifier of the selected candidate entity. Later, viewer B's messaging client sends the sender data to MSEM 140 (because the sender sent viewer B an electronic message, too) and MSEM 140 determines that the sender data is associated with the user profile identifier or the user record identifier.

Analyze Electronic Message to Determine a Stage of the Sender

In an embodiment, an electronic message is associated with a stage or phase in a process, such as a sales process. For example, an electronic message from a sender is in response to a previous, initial electronic message from the viewer. Here, the sender may be considered to be in an early stage of a sales process. Later, an electronic message from the sender is received after a telephone conversation was held with the viewer. Here, the sender may be considered to be in an intermediate stage of the sales process. Later, an electronic message from the sender is received after an in person meeting with the viewer. Here, the sender may be considered to be in a later stage of the sales process. Thus, some electronic messages may be classified as an initial contact, starting business negotiations, approaching a sale, etc.

Determination of a stage associated with an electronic message may be made in a number of ways. For example, an electronic message to which the sender is replying may be "tagged" or associated with a particular stage. The particular stage may be determined based on a subject line of the electronic message by metadata (of the electronic message) specified by the viewer or another user. As another example, the viewer may be prompted (e.g., with a user interface) to assign the electronic message from the sender to a stage with the electronic message is displayed to the viewer. The prompt may be presented before or after data from one or more remote data sources is displayed.

The determination of a stage may be performed by messaging client 130, a plug-in to messaging client 130, or MSEM 140. Once a stage is determined, MSEM 140 causes a user record (corresponding to the sender) in CRM database system 154 to be updated to indicate the stage and, optionally, other information, such as when the stage advancement occurred, a type of electronic message to which the sender replied, and/or the identity of the viewer.

In an embodiment, a sentiment of the electronic message of the sender is determined. The sentiment may be determined based on a textual analysis of text within a body of the electronic message. The determination of a sentiment may be performed by messaging client 130, a plug-in to messaging client 130, or MSEM 140. Once a sentiment is determined, MSEM 140 causes a user record (corresponding to the sender) in CRM database system 154 to be updated to indicate the sentiment. The sentiment may be used to automatically or manually determine a likelihood that the sender will advance to a subsequent stage in the (e.g., sales) process or to the end of the process. For example, if sentiment after a first stage is positive, then likelihood of completing the process may be 35%. Even if sentiment of an electronic message is negative after a third stage, the likelihood of completing the process may still be around 35% since the sender has advanced to subsequent stages.

Benefits

One or more benefits may be realized by at least some embodiments described herein. One benefit is that viewers of electronic messages (e.g., recruiters or sales professionals) are more productive since data gathering and data entry (e.g., into CRM database system 154) can be updated automatically. Thus, less people are required to manually "cleanse" the data. Another benefit may be more complete information about a sender (e.g., a buyer, customer, or prospect) is retrieved and displayed to a viewer since, in some embodiments, online social networks of the sender of a message or other information in the message can be consulted to identify possible matches in records from other data sources. Other benefits may include improved data completeness and accuracy with multiple data sources being automatically consulted, data between disparate data sources is automatically synchronized, and improved likelihood of a conversion (e.g., a hire, sale, etc.).

Another benefit of at least some embodiments described herein is that viewers viewing their inbox of electronic messages will be more productive since they do not need to switch screens, browsers, or applications to view information about a sender. Instead, information about a sender is immediately (or near immediately) presented to a viewer of an electronic message or of a conversation history that includes the electronic message.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
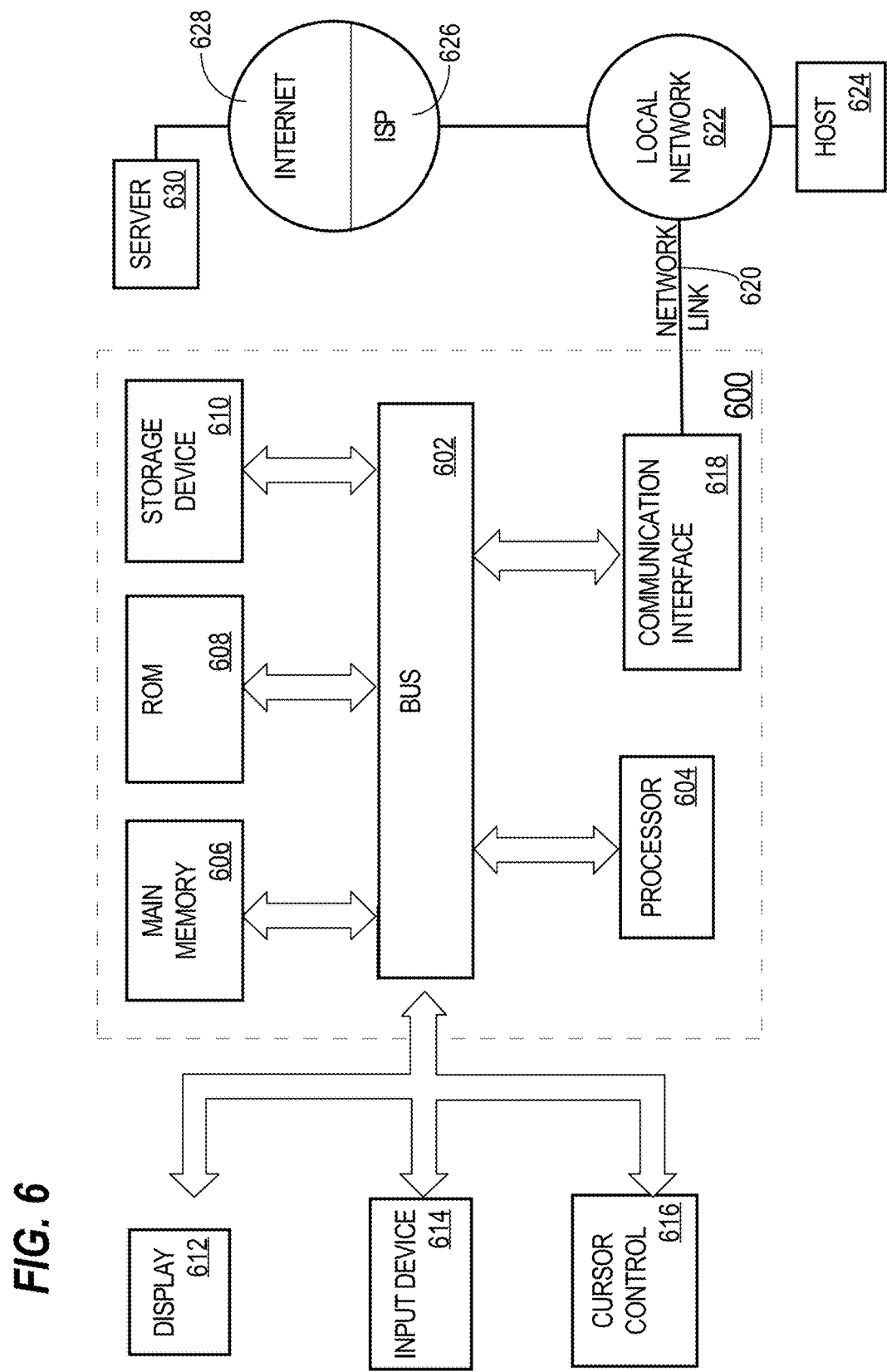
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
   identifying one or more data items that have been extracted from an electronic message that is directed to a particular entity, wherein the one or more data items includes an email address of a sender of the electronic message;
   in response to identifying the one or more data items that have been extracted from the electronic message:
   performing, based on the one or more data items, a first search of a first database system that is remote from an email client executing on a client device associated with the particular entity, to identify one or more first entities that are identified in the first database system;
   performing, based on the one or more first entities, a second search of a second database system that is remote from the email client and that is different than the first database system, to identify one or more second entities identified in the second database system;
   retrieving, from the first database system, first data that pertains to an entity in the one or more first entities;

retrieving, from the second database system, second data that pertains to an entity in the one or more second entities;

combining the first data and the second data to generate sender data about the sender;

causing the sender data to be presented to the particular entity via the email client.

2. The system of claim 1, wherein causing the sender data to be presented comprises causing the sender data to be presented concurrently with the electronic message.

3. The system of claim 1, wherein the one or more data items are a plurality of data items that include one or more of:

a name of the sender;

geographic data that is associated with a geographic location or region;

a company name; or a second email address or a name of another recipient, of the electronic message, that is different than the particular entity.

4. The system of claim 1, wherein the first database system or the second database system is a customer relationship management system, wherein the instructions, when executed by the one or more processors, further cause:

causing the customer relationship management system to be updated based on data retrieved from the other database system.

5. The system of claim 1, wherein the one or more first entities is a plurality of entities, wherein the instructions, when executed by the one or more processors, further cause, prior to combining the first data and the second data:

causing entity data about each entity in the plurality of entities to be presented concurrently to the particular entity;

determining that the particular entity selected a certain entity of the plurality of entities;

wherein identifying the one or more second entities is performed based on the certain entity and no other entity.

6. The system of claim 1, wherein the one or more second entities is a plurality of entities, wherein the instructions, when executed by the one or more processors, further cause, prior to combining the first data and the second data:

causing entity data about each entity in the plurality of entities to be presented concurrently to the particular entity;

determining that the particular entity selected a certain entity of the plurality of entities;

wherein retrieving the second data is performed based on the certain entity and no other entity.

7. A system comprising:

one or more processors;

one or more storage media storing instructions which, when executed by the one or more processors, cause:

identifying one or more data items that have been extracted from an electronic message that is directed to a particular entity, wherein the one or more data items includes an email address of a sender of the electronic message;

based on the one or more data items, retrieving, from a social network service, first profile data about the sender;

based on the one or more data items, retrieving first record data about the sender from an entity database that is separate from the social network service and that stores data about a plurality of entities;

combining at least a portion of the first profile data and at least a portion of the first record data to generate first sender data about the sender;

causing the sender data to be presented via an email client executing on a client device associated with the particular entity;

creating a mapping that associates (1) the email address with (2) a profile identifier that identifies the first profile data with (3) a record identifier that identifies the first record data;

receiving, from a second client device, a request that includes the email address of the sender;

using the email address to identify the mapping;

using the mapping to identify the profile identifier and the record identifier;

retrieving, from the social network service, based on the profile identifier, second profile data;

retrieving, from the entity database, based on the record identifier, second record data;

combining at least a portion of the second profile data and at least a portion of the second record data to generate second sender data;

causing the second sender data to be presented via an email client executing on a second client device.

8. The system of claim 7, wherein the instructions, when executed by the one or more processors, further cause:

generating a probability score based on the one or more data items and a fuzzy matching model;

causing data about the sender to be presented via the email client only if the probability score is above a particular threshold.

9. The system of claim 8, wherein the instructions, when executed by the one or more processors, further cause:

causing data about a plurality of candidate entities to be presented via the email client if the probability score is below the particular threshold.

10. The system of claim 7, wherein the one or more data items are a plurality of data items and the plurality of data items includes a particular email address of another recipient of the electronic message, wherein the instructions, when executed by the one or more processors, further cause:

determining whether an entity indicated in a profile maintained by the social network service is connected, in a social graph, to another entity that is associated with the particular email address.

11. The system of claim 7, wherein:

the second sender data is different than the first sender data;

the second profile data is different than the first profile data or the second record data is different than the first record data.

12. The system of claim 7, wherein the instructions, when executed by the one or more processors, further cause:

causing account data about a plurality of accounts to be displayed to the particular entity;

receiving input, provided by the particular entity, that selects a particular account of the plurality of accounts;

causing association data to be created that associates the record data with the particular account.

13. A system comprising:

one or more processors;

one or more storage media storing instructions which, when executed by the one or more processors, cause:

extracting a plurality of data items from an electronic message that is directed to a particular entity, wherein the plurality of data items includes one or more of:

a domain or a username of an email address of a sender of the electronic message;

geographic data that is associated with a geographic location or region; or a second recipient indicated in the electronic message;

wherein the plurality of data items does not include the email address;

based on the plurality of data items, retrieving first data about the sender from a first database system that is remote relative to a client device associated with the particular entity;

based on the plurality of data items, retrieving second data about the sender from a second database system that is different than the first database system and that is remote relative to the client device associated with the particular entity;

combining the first data and the second data to generate sender data about the sender;

causing the sender data to be displayed in an email client executing on the client device associated with the particular entity.

14. The system of claim 13, wherein the instructions, when executed by the one or more processors, cause:

based on the plurality of data items, retrieving data about a plurality of entities from the first database system or the second database system;

causing the plurality of entities to be displayed;

receiving input, provided by the particular entity, that selects a certain entity from among the plurality of entities, wherein the certain entity is the sender.

15. The system of claim 14, wherein the instructions, when executed by the one or more processors, cause:

based on the input, creating a mapping that associates (1) the email address with (2) a first identifier that identifies, in the first database system, the first data with (3) a second identifier that identifies, in the second database system, the second data.

16. The system of claim 13, wherein the plurality of data items includes a second recipient indicated in the electronic message, wherein the instructions, when executed by the one or more processors, further cause:

based on the second recipient, making a determination that the sender is connected to the second recipient in a social network;

based on the determination, the sender is identified from among a plurality of entities.

17. The system of claim 16, wherein making the determination comprises:

based on the second recipient, retrieving recipient data about the second recipient from the first database system;

retrieving data about the plurality of entities from the first database system or the second database system;

based on the determination, identifying the sender from among the plurality of entities.

* * * * *